(12) United States Patent
Stetson et al.

(10) Patent No.: US 6,425,251 B2
(45) Date of Patent: Jul. 30, 2002

(54) HYDROGEN COOLED HYDRIDE STORAGE UNIT

(75) Inventors: Ned T. Stetson, Auburn Hills; Subramanian Ramachandran, Sterling Heights, both of MI (US)

(73) Assignee: Energy Conversion Devices, Inc., Rochester Hills, MI (US)

( * ) Notice: Subject to any disclaimer, the term of this patent is extended or adjusted under 35 U.S.C. 154(b) by 0 days.

(21) Appl. No.: 09/892,719

(22) Filed: Jun. 28, 2001

Related U.S. Application Data

(63) Continuation of application No. 09/465,904, filed on Dec. 17, 1999, now Pat. No. 6,293,110.

(51) Int. Cl.⁷ .................................................. F17C 3/00
(52) U.S. Cl. ........................................ 62/46.2; 62/48.1
(58) Field of Search ................................ 62/46.1, 46.2, 62/48.1, 480

(56) References Cited

U.S. PATENT DOCUMENTS

| | | | |
|---|---|---|---|
| 4,489,564 A | * 12/1984 | Hausler et al. | ................ 62/48 |
| 4,799,360 A | * 1/1989 | Retallick et al. | ................ 62/48 |
| 5,797,269 A | * 8/1998 | Nishimura et al. | .......... 62/46.2 |
| 5,953,922 A | * 9/1999 | Stetson et al. | ................ 62/46.2 |
| 5,987,895 A | * 11/1999 | Nishimura et al. | .......... 62/46.2 |
| 6,293,110 B1 | * 9/2001 | Stetson et al. | ................ 62/46.2 |

\* cited by examiner

*Primary Examiner*—Denise L. Esquivel
*Assistant Examiner*—Malik N. Drake
(74) *Attorney, Agent, or Firm*—David W. Schumaker; Marvin S. Siskind

(57) ABSTRACT

A hydrogen gas cooled hydrogen storage element which includes a hydrogen storage alloy material in which hydrogen flow channels are provided. The flow channels provide pathways through the hydrogen storage material to allow for high speed hydrogen gas flow. A portion of the high speed hydrogen flow is stored within the storage material which releases its heat of hydride formation. The remainder of the hydrogen flows through the hydrogen storage material at a sufficient mass flow rate to remove the heat of hydride formation.

21 Claims, 7 Drawing Sheets

HYDROGEN COOLED HYDRIDE STORAGE UNIT

RELATED APPLICATION INFORMATION

This application is a continuation of U.S. application Ser. No. 09/465,904, filed Dec. 17, 1999 now U.S Pat. No. 6,293,110.

FIELD OF THE INVENTION

The instant invention relates generally to hydrogen storage units and more specifically to hydrogen gas cooled storage units. The storage unit includes corrugation through which excess high flow rate hydrogen flows, thereby transferring the heat of hydride formation from the storage material to the excess hydrogen and removing it from the storage unit.

BACKGROUND OF THE INVENTION

The instant patent application for the first time, describes a hydrogen storage unit useful for a hydrogen-based economy. The storage unit allows for fast and efficient cooling and/or heating thereof using gaseous hydrogen as a direct, convective heat transfer medium. The instant storage element makes it possible to efficiently and economically transfer heat between subsystems of a complete infrastructure system. Such an infrastructure system (from "source to wheel"), is the subject of copending U.S. application Ser. No. 09/444,810, entitled "A Hydrogen-based Ecosystem" filed on Nov. 22, 1999 for Ovshinsky, et al. (the '810 application), which is hereby incorporated by reference. This infrastructure, in turn, is made possible by hydrogen storage alloys that have surmounted the chemical, physical, electronic and catalytic barriers that have heretofore been considered insoluble. These alloys are fully described in copending U.S. patent application Ser. No. 09/435,497, entitled "High Storage Capacity Alloys Enabling a Hydrogen-based Ecosystem", filed on Nov. 6, 1999 for Ovshinsky et al. ("the '497 application"), which is hereby incorporated by reference. The '497 application relates generally and specifically to alloys which solve the, up to now, unanswered problem of having sufficient hydrogen storage capacity with exceptionally fast kinetics to permit the safe and efficient storage of hydrogen to provide fuel for a hydrogen based economy, such as powering internal combustion engine and fuel cell vehicles. In the '497 application the inventors for the first time disclosed the production of Mg-based alloys having both hydrogen storage capacities higher than about 6 wt. % and extraordinary kinetics. This revolutionary breakthrough was made possible by considering the materials as a system and thereby utilizing chemical modifiers and the principles of disorder and local order, pioneered by Stanford R. Ovshinsky, in such a way as to provide the necessary catalytic local order environments, such as surfaces and at the same time designing bulk characteristics for storage and high rate charge/discharge cycling. In other words, these principles allowed for tailoring of the material by controlling the particle and grain size, topology, surface states, catalytic activity, microstructure, and total interactive environments for storage capacity.

The combination of the '810 and the '497 applications solves the twin basic barriers which have held back the use of the "ultimate fuel," namely hydrogen storage capacity and a hydrogen infrastructure. With the use of the alloys of the '497 application, hydrogen can be shipped safely by boats, barges, trains, trucks, etc. when in solid form. However, the infrastructure of the '810 application requires thermal management and efficient heat utilization throughout the entire system. The instant invention makes the necessary heat transfer between the subsystems of the infrastructure simple, efficient, and economic.

As the world's population expands and its economy increases, the atmospheric concentrations of carbon dioxide are warming the earth causing climate change. However, the global energy system is moving steadily away from the carbon-rich fuels whose combustion produces the harmful gas. Experts say atmospheric levels of carbon dioxide may be double that of the pre-industrial era by the end of the next century, but they also say the levels would be much higher except for a trend toward lower-carbon fuels that has been going on for more than 100 years. Furthermore, fossil fuels cause pollution and are a causative factor in the strategic military struggles between nations. Furthermore, fluctuating energy costs are a source of economic instability worldwide.

For nearly a century and a half, fuels with high amounts of carbon have progressively been replaced by those containing less. First wood, which is high in carbon, was eclipsed in the late $19^{th}$ century by coal, which contains less carbon. Then oil, with a lower carbon content still, replace coal in the 1960's. Now analysts say that natural gas, lighter still in carbon, may be entering its heyday, and that the day of hydrogen—providing a fuel with no carbon at all—may at last be about to dawn. As a result, experts estimate the world's economy today burns less than two-thirds as much carbon per unit of energy produced as it did in 1860, despite the fact that carbon based fuels are still being used by the automotive industry.

In the United States, it is estimated, that the trend toward lower-carbon fuels combined with greater energy efficiency has, since 1950, reduced by about half the amount of carbon spewed out for each unit of economic production. Thus, the decarbonization of the energy system is the single most important fact to emerge from the last 20 years of analysis of the system. It had been predicted that this evolution will produce a carbon-free energy system by the end of the $21^{st}$ century. The instant invention helps to shorten that period to a matter of years. In the near term, hydrogen will be used in fuel cells for cars, trucks and industrial plants, just as it already provides power for orbiting spacecraft. But ultimately, hydrogen will also provide a general carbon-free fuel to cover all fuel needs.

As noted in recent newspaper articles, large industries, especially in America, have long been suspicious of claims that the globe is warming and have vociferously negated the science of climate change. Electric utilities, among others, initially took the position that international treaties on climate change would cut economic growth and cost jobs. A dramatic shift has now occurred, in which the problems are finally being acknowledged and efforts are at last being undertaken to solve them. Therefore, it is very encouraging that some of the world's biggest companies, such as Royal Dutch/Shell and BP Amoco, two large European oil firms, now state plainly what was once considered heresy: global warming is real and merits immediate action. A number of American utilities have vowed to find ways to reduce the harm done to the atmosphere by their power plants. DuPont, the world's biggest chemical firm, has even declared that it will voluntarily reduce its emissions of greenhouse gases to 35% of their level in 1990 within a decade. The automotive industry, which is a substantial contributor to emissions of greenhouse gases and other pollutants (despite its vehicular specific reductions in emissions), has now realized that change is necessary as evidenced by their electric and hybrid vehicles. In this field, the assignee of the subject invention, has developed the Ovonic nickel metal hydride battery, the enabling battery making electric and hybrid vehicles possible.

FIG. 1, taken from reliable industrial sources, is a graph demonstrating society's move toward a carbon-free environment as a function of time starting with the use of wood in the early 1800s and ending in about 2010 with the beginning of a "hydrogen" economy. In the 1800s, fuel was primarily wood in which the ratio of hydrogen to carbon was about 0.1. As society switched to the use of coal and oil, the ratio of hydrogen to carbon increased first to 1.3 and then to 2. Currently, society is inching closer to the use of methane in which the hydrogen to carbon ratio is further increased to 4 (methane has serious problems with safety, cost and infrastructure). However, the ultimate goal for society is to employ a carbon-free fuel, i.e., the most ubiquitous of elements, pure hydrogen. The obstacle has been the lack of solid state storage capacity and infrastructure. The inventors of the '497 and the '810 applications have made this possible by inventing a 7% storage material (7% is an umoptimized fugure and will be increased along with better kinetics) with exceptional absorption/desorption kinetics, i.e. at least 80% charge in less than 2 minutes and an infrastructure to use these storage alloys. These alloys allow for the first time, a safe, high capacity means of storing, transporting and delivering pure hydrogen.

Hydrogen is the "ultimate fuel." It is inexhaustible and is considered by most to be "THE" fuel for the next millennium. Hydrogen is the most plentiful element in the universe (over 95% of all matter) and was the first element created by the "Big-Bang." Hydrogen can provide a clean source of energy for our planet which can be produced by various processes which split water into hydrogen and oxygen and the hydrogen can be stored and transported in solid state form. For example, economical, lightweight, triple-junction amorphous silicon solar cells solar cells (an invention pioneered by Stanford R. Ovshinsky) such as those set forth in U.S. Pat. No. 4,678,679, (the disclosure of which is incorporated herein by reference) can be readily disposed adjacent a body of water, where their inherently high open circuit voltage can be used to dissociate water into its constituent gases, and the hydrogen so produced can be collected. These high efficiency, lightweight solar panels can also be place on nearby farms, in water, or on land. It is notable that the photovoltaic process for dissociating water to form hydrogen can be a step toward solving the problems of water purification throughout the world. Electricity can be generated to transport and pump the hydrogen into metal hydride storage beds that include the high storage capacity, lightweight metal hydride alloys. The ultra-high capacities of the alloys of the '497 application allow this hydrogen to be stored in solid form and transported by barge, tanker, train or truck in safe, economical form for ultimate use. Energy is the basic necessity of life and civilization for any society today and the use of hydrogen in the manner described herein as the basic source of energy would minimize the likelihood of wars fought for control of fossil fuels. Instead of "from well to wheel," the phrase now recited will be "from source to wheel."

In the past considerable attention has been given to the use of hydrogen as a fuel or fuel supplement. While the world's oil reserves are depletable, the supply of hydrogen remains virtually unlimited. While hydrogen can be produced from coal, natural gas and other hydrocarbons, it is preferable to form hydrogen by the electrolysis of water, preferably via energy from the sun which is composed mainly of hydrogen and can, itself, be thought of as a giant hydrogen "furnace". However, hydrogen can also be produced by the electrolysis of water using any other form of economical energy (e.g., wind, waves, geothermal, hydroelectric, nuclear, etc.) Furthermore, hydrogen, is an inherently low cost fuel. Hydrogen has the highest density of energy per unit weight of any chemical fuel and is essentially non-polluting since the main by-product of "burning" hydrogen is water. Thus, hydrogen can be a means of solving many of the world's energy related problems, such as climate change, pollution, strategic dependancy on oil, etc., as well as providing a means of helping developing nations.

While hydrogen has wide potential application as a fuel, a major drawback in its utilization, especially in mobile uses such as the powering of vehicles, has been the lack of an acceptable lightweight hydrogen storage medium. Storage of hydrogen as a compressed gas involves the use of large and heavy vessels. Thus, as shown in FIG. 2, compressed hydrogen at 5000 psi only has a hydrogen density of 31 g/liter. Additionally, large and very expensive compressors are required to store hydrogen as a compressed gas and compressed hydrogen gas is a very great explosion/fire hazzard.

Hydrogen also can be stored as a liquid. Storage as a liquid, however, presents a serious safety problem when used as a fuel for motor vehicles since hydrogen is extremely flammable. Liquid hydrogen also must be kept extremely cold, below −253° C., and is highly volatile if spilled. Moreover, liquid hydrogen is expensive to produce and the energy necessary for the liquefaction process is a major fraction of the energy that can be generated by burning the hydrogen. Another drawback to storage as a liquid is the costly losses of hydrogen due to evaporation, which can be as high as 5% per day. Also, the storage density of liquid hydrogen, as shown in FIG. 2 is only 71 g/liter.

For the first time, storage of hydrogen as a solid hydride, using the atomically engineered alloys of the '497 application can provide a greater percent weight storage than storage as a compressed gas or a liquid in pressure tanks. Also, hydrogen storage in a solid hydride is safe and does not present any of the hazard problems that hydrogen stored in containers as a gas or a liquid does, because hydrogen, when stored in a solid hydride form, exists in it's lowest free energy state. As shown, again in FIG. 2, storage of hydrogen in a 7% Ovonic thermal hydrogen storage alloy provides a hydrogen density of 103 g/liter, more than 3 times the density of compressed hydrogen gas.

In addition to the problems associated with storage of gaseous or liquid hydrogen, there are also problems associated with the transport of hydrogen in such forms. For instance transport of liquid hydrogen will require super-insulated tanks, which will be heavy and bulky and will be susceptible to rupturing and explosion. Also, a portion of the liquid hydrogen will be required to remain in the tanks at all times to avoid heating-up and cooling down of the tank which would incur big thermal losses. As for gaseous hydrogen transportation, pressurized tankers could be used for smaller quantities of hydrogen, but these too will be susceptible to rupturing and explosion. For larger quantities, a whole new hydrogen pipeline transportation system would need to be constructed or the compressor stations, valves and gaskets of the existing pipeline systems for natural gas will have to be adapted and retrofitted to hydrogen use. This assumes, of course, that the construction material of these existing pipelines will be suited to hydrogen transportation.

The instant invention is useful in the infrastructure system of the '810 application. When hydrogen is transferred into a storage bed, heat is liberated when the hydrogen and metallic material reacts to form the hydrides. This heat must be removed to allow the hydriding reactions to proceed to completion. Conversely, heat is absorbed during the decomposition of the hydride to release hydrogen, and the hydrides are preferably heated during their decomposition to provide an adequate rate of liberation of hydrogen therefrom.

In the past, heating and cooling of the metallic hydride material has been accomplished by conventional techniques including heating or cooling the container in which the material is held, or spacing tubes throughout the bed of hydride material and circulating a heat exchange medium in the tubes. In such techniques, the amount of heat transferred to the metallic hydride depends on the area of the container or the surface area of the tubes extending through the bed, as well as on the conductive heat transfer characteristics of the metallic hydride. It has also been suggested to use hydrogen gas itself as a convective energy carrier, and, thus, overcome the limitations of the above-mentioned techniques. In addition, the direct cooling and heating of the hydrides permits rapid cycling between charge and discharge operations, and, thus, increase the efficiency of a given system. As proposed in paper number 760569 presented at the SAE Fuels and Lubricants Meeting in St. Louis, Mo., Jun. 7–10, 1976, by Hoffman et al. of Brookhaven National Laboratory, hydrogen would be circulated through the metallic hydride in the containers to carry heat directly to where it is needed. Heat exchange would take place with the hydrogen in an external heat exchanger to supply the heat to the hydrogen. This technique is also used in U.S. Pat. No. 4,185,979 issued Jan. 29, 1980 to Woolley. However, even though direct convective hydrogen cooling of the thermal hydrogen storage beds is well known in the art, no one had designed or optimized the hydrogen storage units for this type of cooling, thus there is a need for such an optimized hydrogen storage unit in the art.

SUMMARY OF THE INVENTION

The instant invention provides for a hydrogen gas cooled hydrogen storage element which includes a hydrogen storage alloy material in which hydrogen flow channels are provided. The flow channels provide pathways through the hydrogen storage material to allow for high speed hydrogen gas flow. A portion of the high speed hydrogen flow is stored within the storage material which releases its heat of hydride formation. The remainder of the hydrogen flows through the hydrogen storage material at a sufficient mass flow rate to remove the heat of hydride formation.

The hydrogen storage alloy material powder is formed into a belt of hydrogen storage material by compaction and/or sintering and may include a support means. The support means is typically at least one selected from the group consisting of mesh, grid, matte, foil, foam and plate and is formed from a metal selected from the group consisting of Ni, Al, Cu, Fe and mixtures or alloys thereof. The storage alloy powder physically bonded to the support means, if any, is then spirally wound into a coil. Hydrogen flow channels are provided within the coil by either corrugating at least one surface of the belt of hydrogen storage alloy material or by interleaving a corrugated material or a foam, mesh, matte or even expanded metal sheet within the spirals of the coil. The corrugated material or foam, mesh, matte or expanded metal sheet can be formed form metals or thermally conductive non-metals.

DETAILED DESCRIPTION OF THE INVENTION

Computer modeled analysis of the cooling requirement for hydrogen storage units when being charged at a very high rate have shown that if the hydrogen storage alloy material is formed into an annular tube, with a central cooling channel through which hydrogen is flown at high rates, the limit to the thickness of the annulus is about 2 mm. That is, computer modeling indicates that the maximum distance from the cooling channel within the annular member will be 2 mm for proper cooling upon charge. However, it has also been determined by this computer modeling that, using the units of the instant invention, none of the hydrogen storage materials will ever be more than 1 mm from a cooling channel.

In order to provide for a hydrogen storage unit which is convectively cooled by high flow rate hydrogen, the unit requires that the storage material allow for high rate hydrogen flow therethrough. Thus, rather than just flowing the coolant gas, hydrogen, over the exterior surface of the storage unit, or a single internal surface of an annular storage material, hydrogen needs to flow at a high rate directly through the hydrogen storage material in coolant channels. Therefore, the storage material will need flow channels through it to allow for the high flow rate of the hydrogen coolant. Also, since high speed gas is flowing through the storage material, the material needs to be compacted and restrained from entraining into the hydrogen flow. The storage unit of the instant invention allows for high speed hydrogen flow through the storage material, thus allowing for efficient convective heating and cooling, while avoiding entrainment of the compacted/sintered storage alloy.

Figure 1:
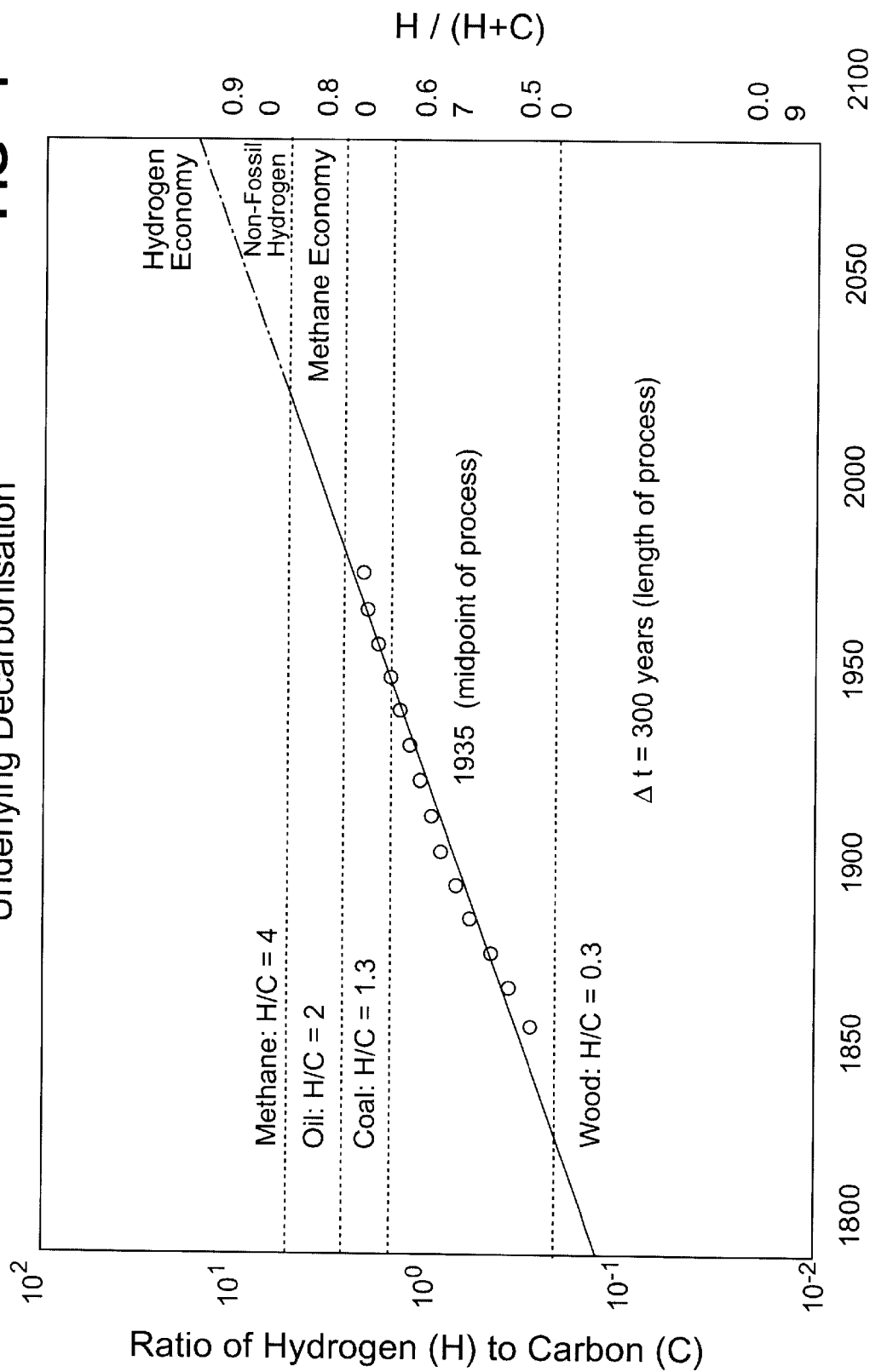
FIG. 1 is a graph having time plotted on the abscissa and the H/C ratio plotted on the ordinate, said graph demonstrating the movement of society toward carbon-free sources of fuel.
Figure 2:
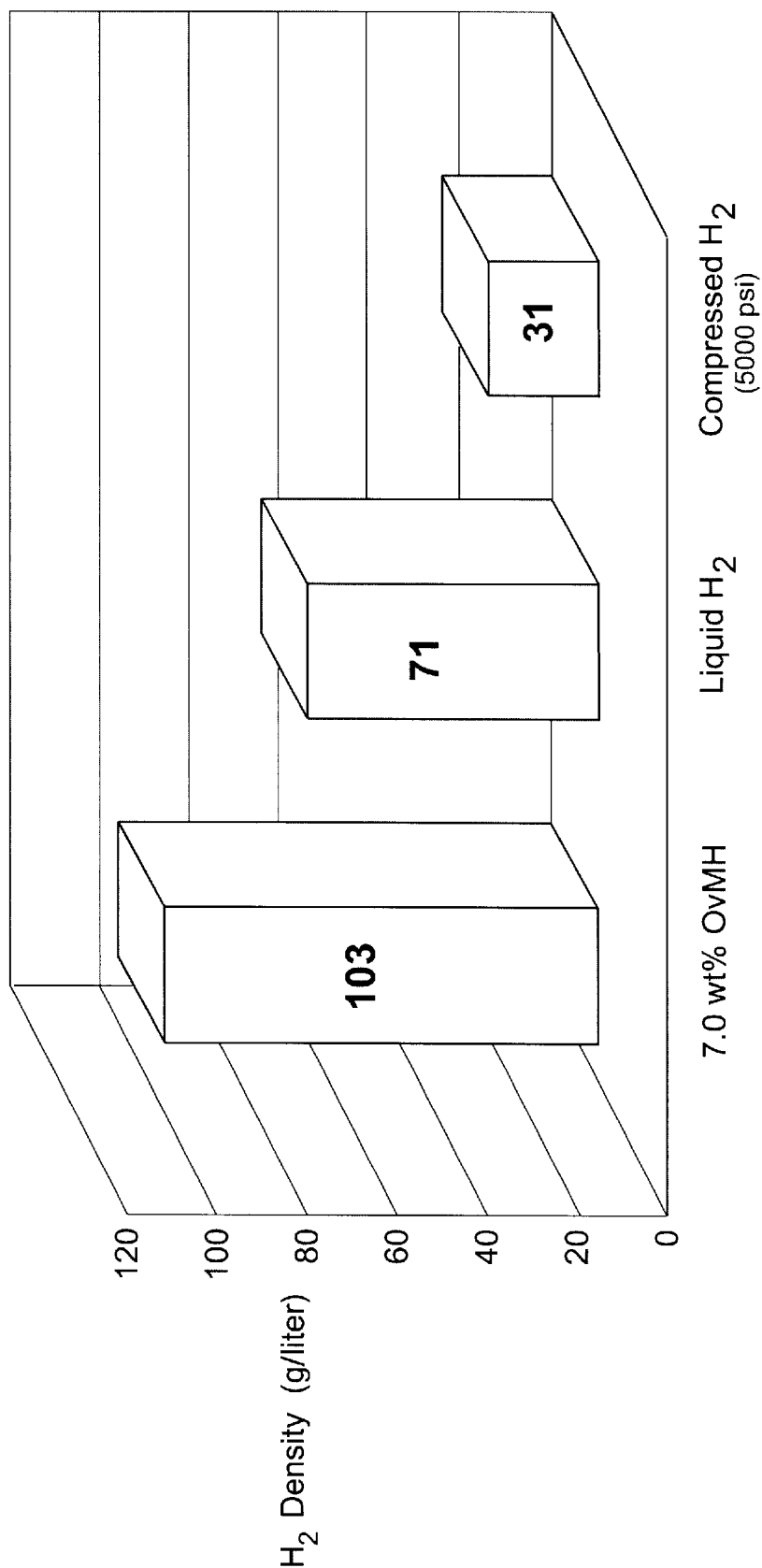
FIG. 2 is a graphical bar-chart of hydrogen storage density in g/liter for hydrogen stored as a compressed hydrogen, liquid hydrogen, and a 7% Ovonic solid hydride storage material.
Figure 3:
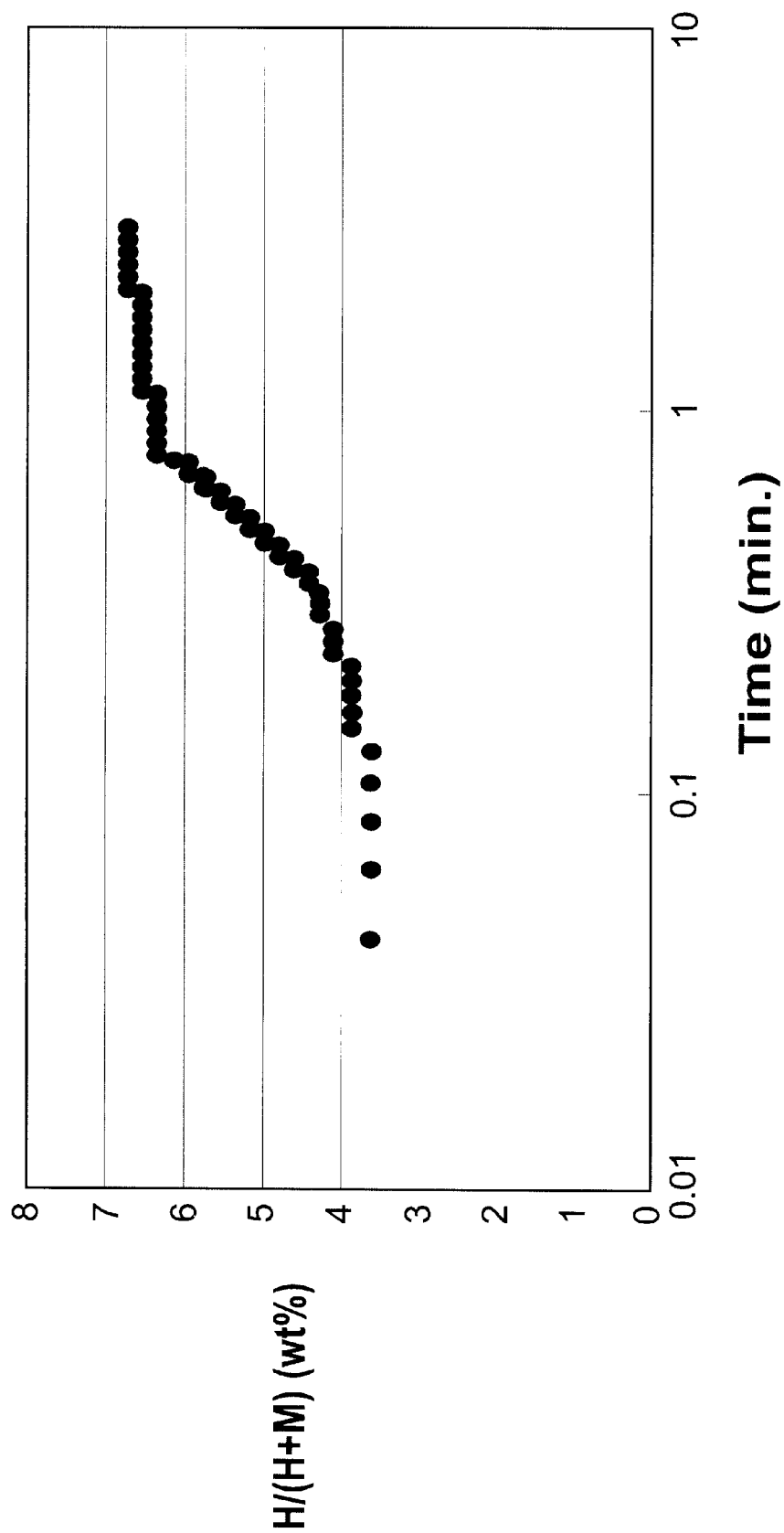
FIG. 3, is a plot of hydrogen storage versus time at 300° C. for a compressed hydrogen storage pellet of a Mg-based alloy useful in the storage units of the instant invention.

Any alloy which safely and efficiently stores and releases hydrogen may be used in the storage unit of the instant invention. Specifically useful are alloys such as Ti—Zr based $AB_2$ room temperature hydrogen storage alloys and high capacity Mg-based storage alloys. Most useful are the high capacity, high kinetics storage alloys of the '497 application. In general the alloys contain greater than about 90 weight % magnesium, and contain at least one modifier element. The at least one modifier element creates a magnesium based alloy which is capable of storing at least 6.9 weight % hydrogen and is capable of absorbing 80% of the full storage capacity of hydrogen in under 1.5 minutes at 300° C. The modifier elements mainly include Ni and Mm (misch metal) and can also include additional elements such as Al, Y and Si. Thus the alloys will typically contain 0.5–2.5 weight % nickel and about 1.0–4.0 weight % Mm (predominantly contains Ce and La and Pr). The alloy may also contain one or more of 3–7 weight % Al, 0.1–1.5 weight % Y and 0.3–1.5 weight % silicon. An example of the absorption kinetics of such as magnesium based alloy which has been formed into a pellet is shown in FIG. 3, in which the hydrogen storage versus time is plotted. As can be seen, the material is capable of storing more than 6.5 weight % hydrogen and absorbs 6.5 weight % in 1.4 minutes at 300° C. This is excellent capacity and kinetics indeed.

Figure 4:
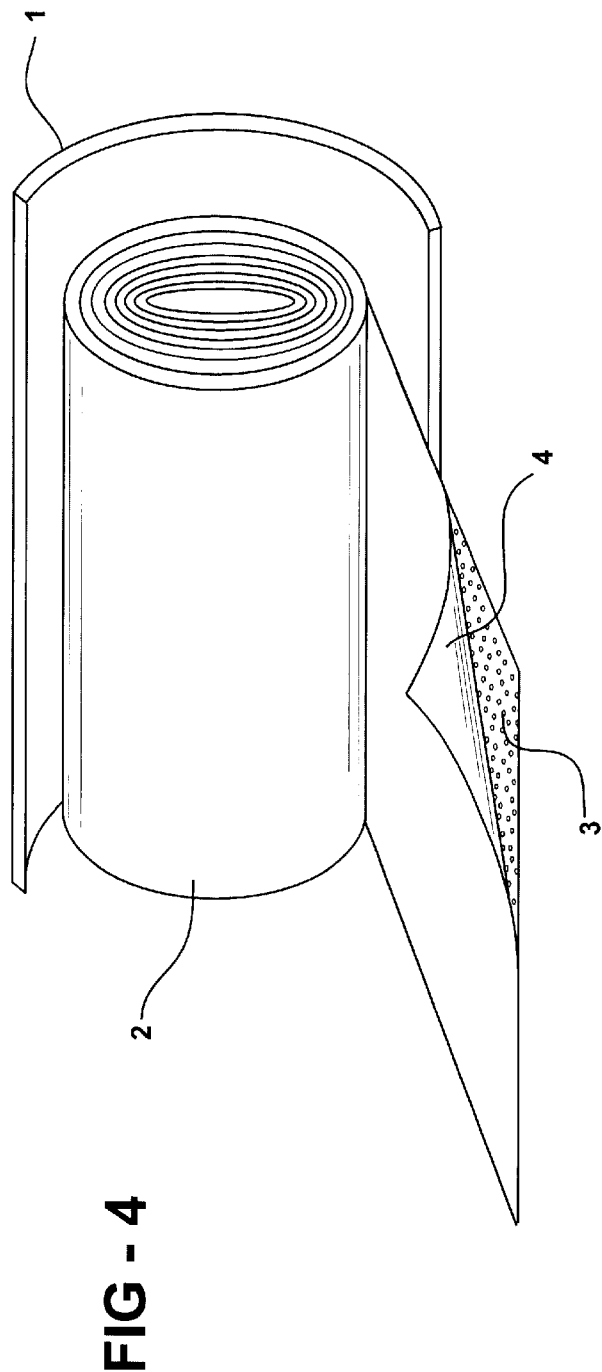
FIG. 4 is a partial cut-away schematic depiction of a hydrogen storage unit according to the instant invention.

FIG. 4 is a partial cut-away view of the hydrogen cooled storage unit of the instant invention. The unit specifically includes a casing 1, which houses the storage coil 2, which is composed of a spirally wound hydrogen storage alloy belt 3 interleaved with a sheet of flow channel material 4 which allows for flow of the high flow rate hydrogen through the storage unit.

The hydrogen storage alloy belt 3 includes a hydrogen storage alloy which may be bonded to a support means. The support means may be formed from a variety of materials with the appropriate thermodynamic characteristics that can help to provide heat transfer into and out of said hydrogen storage alloy. The useful materials for the support means include both metals and non-metals. Preferable metals include those from the group consisting of Ni, Al, Cu, Fe and mixtures or alloys thereof. Examples of support means that can be formed from metals include wire mesh, expanded metal and foamed metal. This support material may, store hydrogen, which may improve the overall performance of the storage unit.

The hydrogen storage alloy material may be physically bonded to the support means by compaction and/or sintering processes. The alloy material is first converted into a fine powder. The powder is then compacted, optionally onto the support means, to form a belt of storage material. The compaction process causes the powder to adhere to itself and, if included, become an integral part of the support means. After compaction, the belt including any support means that has been impregnated with alloy powder is preheated and then sintered. The preheating process liberates excess moisture and discourages oxidation of the alloy powder. Sintering is carried out in a high temperature, substantially inert atmosphere containing hydrogen. The temperature is sufficiently high to promote particle-to-particle bonding of the alloy material as well as the bonding of the alloy material to any support means.

The hydrogen storage alloy belt is then spirally wound into a coil along with along interleaved sheet of flow channel material 4 which provides the hydrogen flow channels for the high flow rate hydrogen. The flow channel material 4 is formed from a thermally conductive sheet of material which very highly porous and thus allows for high speed flow of hydrogen through the unit. The flow channel material may be formed from polymers or metals or even thermally conductive non-metals. Examples of polymers would be corrugated polypropylene sheet porous polytetrafluoroethylene sheet. Metals, if used would be in the form of a corrugated metal sheet, expanded metal, or metal foam, matte or mesh. The metal may be capable of storing hydrogen also, thereby enhancing the overall storage capacity of the system. Useful metals include Cu, Ni and Al and mixtures or alloys thereof. Useful non-metals can include thermally conductive ceramics and thermally conductive graphite materials. The non-metals may be in the form of corrugated sheet, foam, matte or mesh of non-metals fibers, etc. Once again, the non-metal may also store hydrogen, thereby enhancing the storage capacity of the system. It should be noted that the hydrogen storage alloy belts 3 and the flow channel sheets 4 may be interleaved in any proportion desired to provide adequate cooling to the storage alloy. That is, it may be desirable to include many hydrogen storage belt layers per flow channel layer in the final product, or visa-versa. As an alternative to spirally winding a separate flow channel material 4 into the coil 2, the belt of storage material 3 may be corrugated on one or both surfaces thereof before coiling, thus providing in-situ corrugation.

Compacting and sintering the alloy material onto a support means increases the packing density of the alloy material, thereby improving the thermodynamic and kinetic characteristics of the hydrogen storage system. The close contact between the support means and the alloy material improves the efficiency of the heat transfer into and out of the hydrogen storage alloy material as hydrogen is absorbed and desorbed. In addition, the uniform distribution of the storage alloy/support means throughout the interior of the container provides for an even temperature and heat distribution throughout the bed of alloy material. This results in a more uniform rates of hydrogen absorption and desorption throughout the entirety thereof, thus creating a more efficient energy storage system.

One problem when using just alloy powder (without a support means) in hydrogen storage beds is that of self-compaction due to particle size reduction. That is, during repeated hydriding and dehydriding cycles, the alloy materials expand and contract as they absorb and desorb hydrogen. Some alloy materials have been found to expand and contract by as much as 25% in volume as a result of hydrogen introduction into and release from the material lattice. As a result of the dimensional change in the alloy materials, they crack, undergo fracturing and break up into finer and finer particles. After repeated cycling, the fine particles self-compact causing inefficient hydrogen transfer as well as high stresses that are directed against the walls of the storage container. Also, within the present system, the particles of the storage material may be entrained into the high flow rate gas stream, and be carried out of the storage unit.

However, the processes used to attach the alloy material onto the support means keeps the alloy particles firmly bonded to each other as well as to the support means during the absorption and desorption cycling. Furthermore, the tight packaging of the support means within the container serves as a mechanical support that keeps the alloy particles in place during the expansion, contraction and fracturing of the material.

The coils 2 may be of any axial length and diameter, as required by the end use. However, the economics costs and physical capability/practicality of production machinery must be taken into account. Coils produced by the instant inventors are typically 2–5 inches in axial length and 1–4 inches in diameter. The coils can have a central annular opening if desired, but this is not necessary. The central annular opening can be used to insert combustive or electric heaters if desired to assist in release of the hydrogen, if needed for the end use applications.

Figure 5:
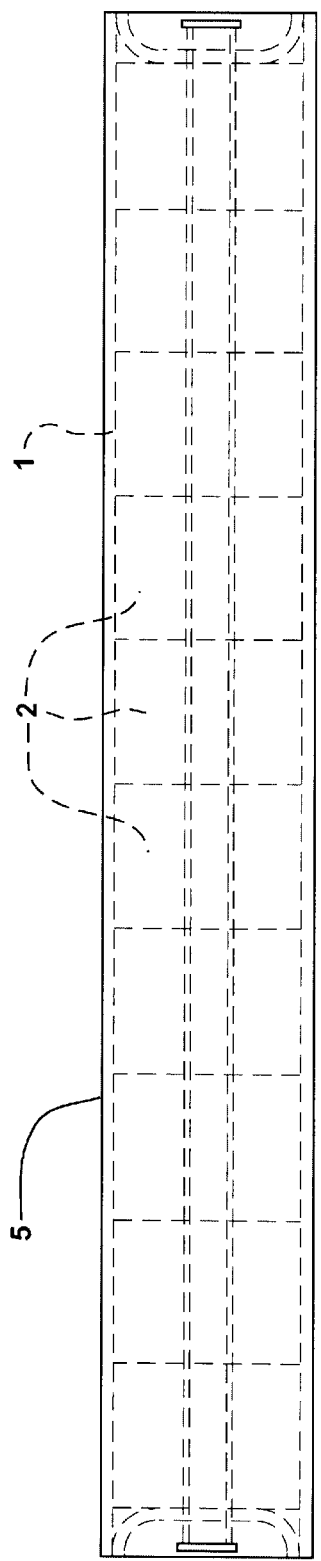
FIG. 5 is a schematic depiction of a hydrogen storage unit according to the instant invention which includes multiple storage coils in a single casing.

Once the coils are manufactured, adding capacity to any hydrogen storage unit is as simple as packing multiple coils into a single or multiple casings. As shown in FIG. 5, many coils 2 can be placed into one casing 1 to form a storage unit 5. This allows for easy, economic manufacture of the coils themselves, but also allows for large capacity storage systems by combining many coils into one system.

Figure 6:
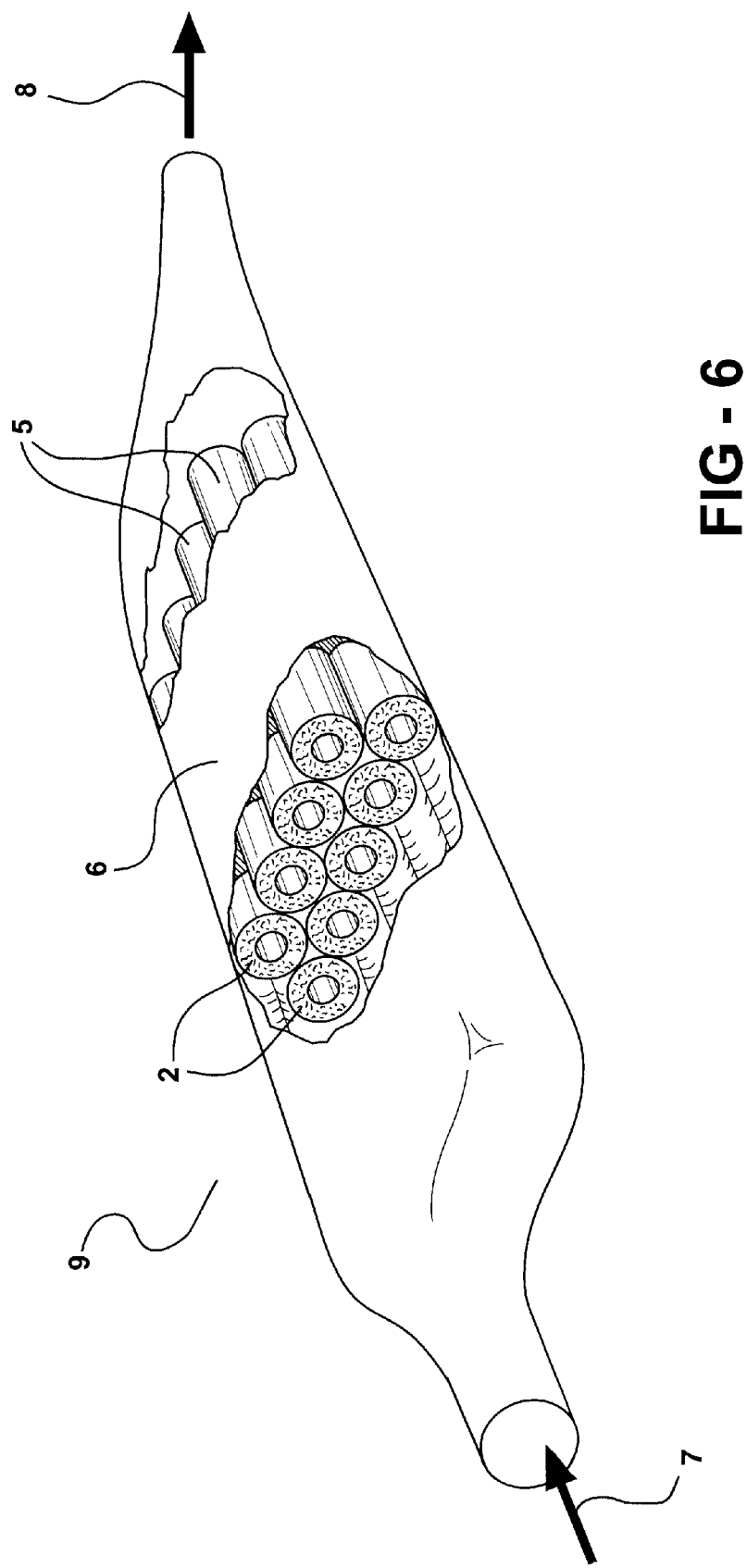
FIG. 6 is a schematic depiction of a hydrogen storage bed which includes the hydrogen storage units according to the instant invention.

Once the multiple coils 2 are inserted into a casing 1 to form a unit 5, multiple units can be bundled into a complete storage bed. FIG. 6 shows how multiple units 5 can be packed into an outer shell 6 to form such a bed 9 (hydrogen inlet and outlet ports and manifolds are not shown). This bed 9 can also be cooled/heated external to the casings of the individual units through ports 7 and 8. The external heating/cooling can accomplished via hydrogen gas or other useful gaseous or liquid heat transfer media. It should be noted that while a specific bed 9 shape and design are depicted, one of ordinary skill in the art could modify these parameters and still be within the spirt and scope of the instant invention.

Figure 7:
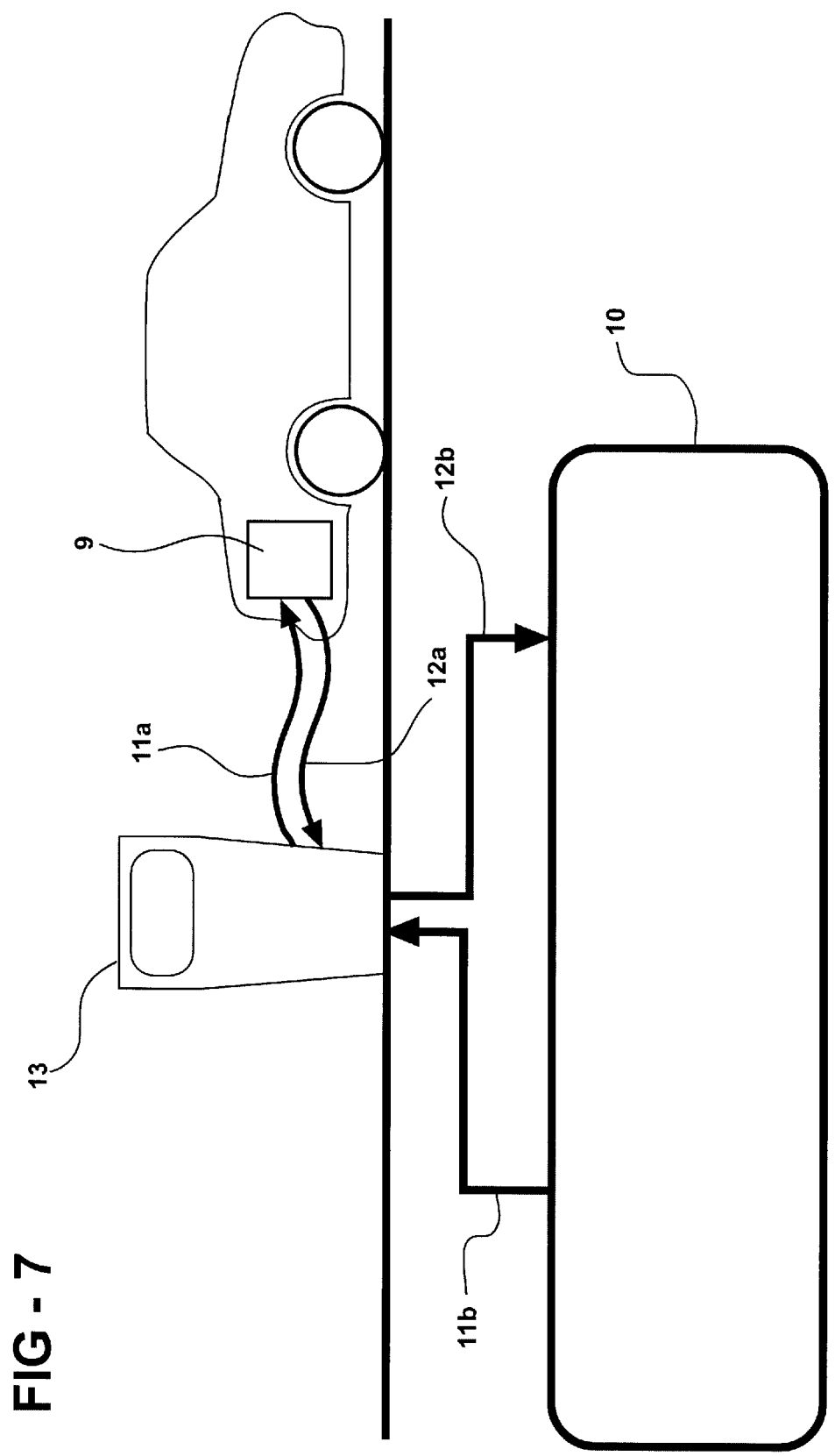
FIG. 7 is a stylistic depiction of a hydrogen refueling station.

FIG. 7 is a stylistic depiction of a hydrogen refueling station which specifically shows how hydrogen is used to capture the heat of hydride formation in the vehicles storage bed 9 and transfer that heat to the stations primary hydride storage bed 10 to assist in the release of hydrogen from the primary storage bed. Specifically, high flow rate hydrogen is dispensed from the "pump" 13 into the vehicle's hydrogen storage bed 9 through cool hydrogen supply line 11a. Some of the hydrogen is absorbed into the hydrogen storage material within the bed, thereby releasing heat of hydride formation. This heat is removed by the excess cool hydrogen. The now heated hydrogen leaves storage bed 9 and is transported to the pump 13 via hot hydrogen return line 12a. The hot hydrogen is then transported from the pump 13 to the stations primary hydrogen storage bed 10 via hot hydrogen return line 12b. The hot hydrogen releases its heat into the hydrogen storage material within bed 10 to assist in providing the required heat (heat of dehydriding) to release the stored hydrogen therein. The released hydrogen, now cooler, is supplied to the pump 13, via cool hydrogen supply line 11b, to ultimately be sent again to the vehicles hydrogen storage bed 9. This set up allows for very fast charging of a vehicles storage bed 9, and yet eliminates waste of the released heat and overheating of the bed.

Hydrogen Powered Internal Combustion Engine and Fuel Cell Vehicles

The instant storage unit is useful as a hydrogen supply for many applications. One such application is the field of automobiles. Specifically, the storage unit can be used as a source of hydrogen for internal combustion engine (ICE) or fuel cell (FC) vehicles.

Figure 8:
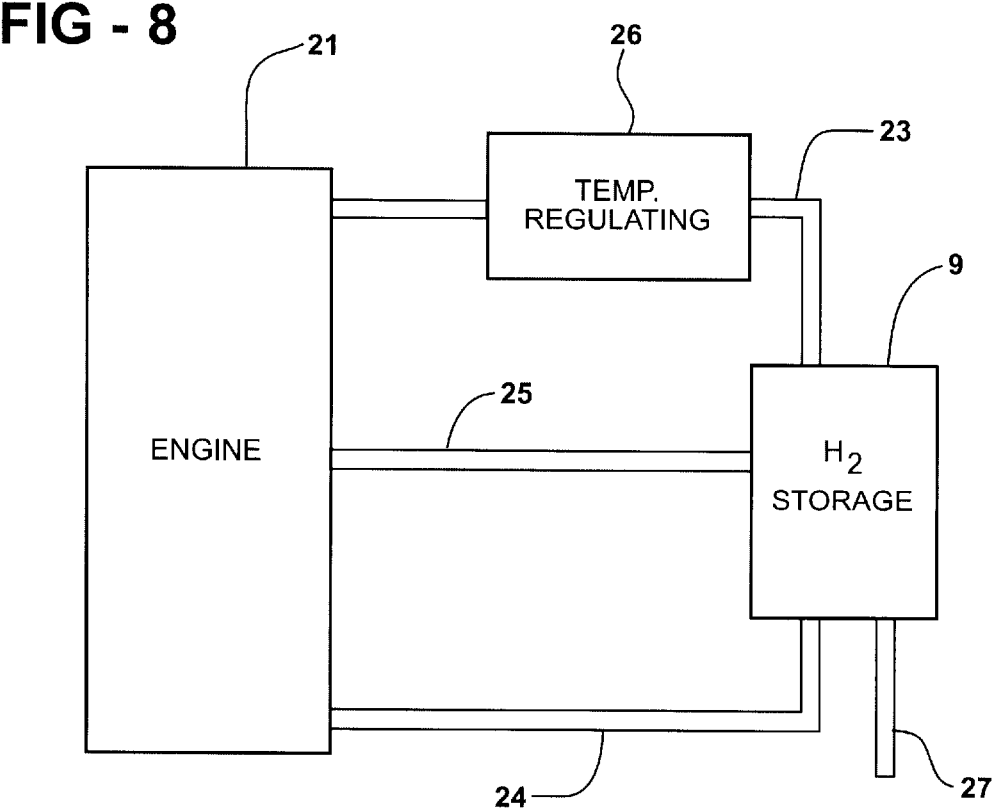
FIG. 8 shows a schematic representation of a hydrogen gas supply system for powering an internal combustion engine vehicle.

FIG. 8 shows a schematic representation of a hydrogen gas supply system for an ICE vehicle, which is for supplying a hydrogen engine 21 with hydrogen gas. The system has a hydrogen gas storage bed 9 and an engine waste heat transfer supply passage 23 which leads engine waste heat (in the form of exhaust gas or engine coolant) discharged from the engine 21 to the hydrogen gas storage bed 9. The system also includes a return passage 24 for returning any engine coolant used to heat the hydrogen storage material back to the engine 21 and an exhaust gas vent 27 for releasing used exhaust gas. The system further includes a hydrogen gas supply passage 25 which leads hydrogen gas from the hydrogen gas storage bed 9 to the engine 21. The engine waste heat transfer supply passage 23 is provided with a temperature regulating unit 26 which regulates the temperature of the waste heat to be introduced into the hydrogen gas storage bed 9. With such a system, waste heat generated within the ICE can be efficiently used to heat the hydrogen storage material to release hydrogen therefrom for use in the ICE.

Figure 9:
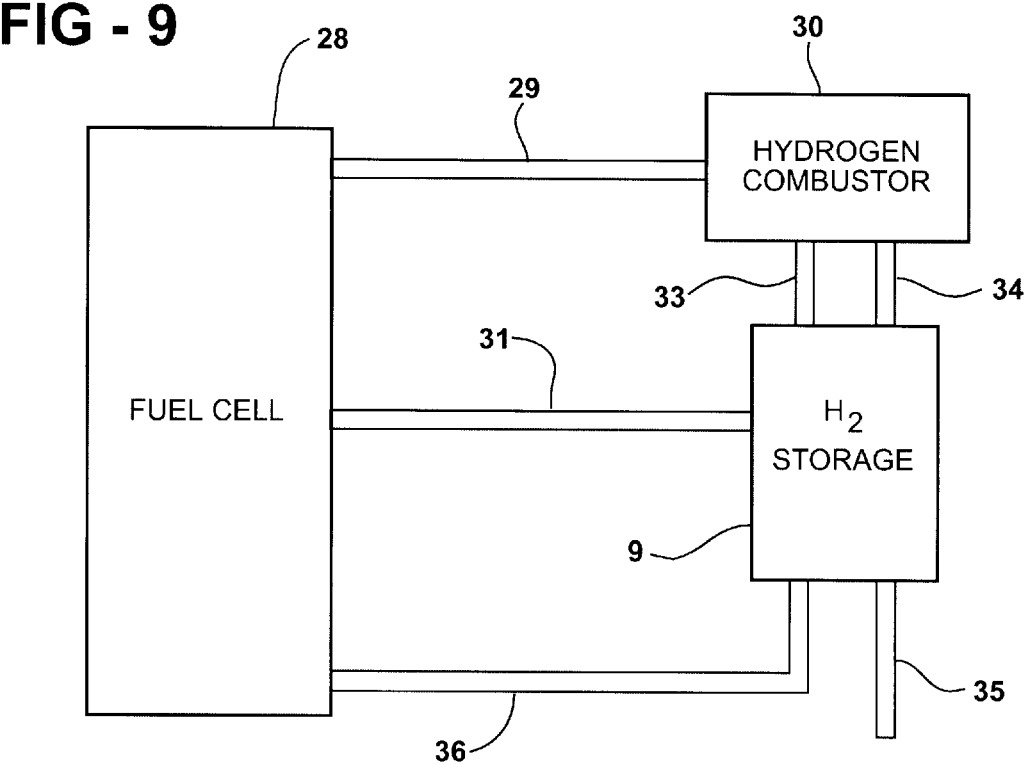
FIG. 9 shows a schematic representation of a hydrogen gas supply system for powering for a fuel cell vehicle.

FIG. 9 shows a schematic representation of a hydrogen gas supply system for an FC vehicle, which is for supplying a fuel cell 28 with hydrogen gas. The system has a hydrogen gas storage bed 9 and a fuel cell waste heat/hydrogen transfer supply passage 29 which leads fuel cell waste heat and unused hydrogen discharged from the fuel cell 28 to a hydrogen gas combustor 30. Waste heat from the fuel cell may be in the form of heated gases or heated aqueous electrolyte. The hydrogen combustor 30, heats a thermal transfer medium (preferably in the form of the aqueous electrolyte from the fuel cell) utilizing waste heat from the fuel cell 28, and by combusting hydrogen. Hydrogen is supplied to the combustor 30 via unused hydrogen from the fuel cell 28, and via fresh hydrogen supplied from the hydrogen storage bed 9 via hydrogen supply line 34. Heated thermal transfer medium is supplied to the hydrogen storage bed 9 via supply line 33. The system also includes a return passage 36 for returning any fuel cell aqueous electrolyte used to heat the hydrogen storage material back to the fuel cell 28 and an exhaust gas vent 35 for releasing used combustor gas. The system further includes a hydrogen gas supply passage 31 which leads hydrogen gas from the hydrogen gas storage bed 9 to the fuel cell 28.

While the invention has been described in connection with preferred embodiments and procedures, it is to be understood that it is not intended to limit the invention to the described embodiments and procedures. On the contrary it is intended to cover all alternatives, modifications and equivalence which may be included within the spirit and scope of the invention as defined by the claims appended hereinafter.

We claim:

1. A hydrogen gas cooled hydrogen storage element comprising:
   a hydrogen storage alloy; and
   hydrogen flow channels provided within said hydrogen storage alloy, said flow channels providing pathways through said hydrogen storage alloy; said pathways allowing for high speed hydrogen gas flow therethrough such that a portion of said hydrogen gas flow is stored within said hydrogen storage alloy thereby releasing heat and the remainder of said hydrogen gas flow removes said heat from said hydrogen storage alloy.

2. The hydrogen gas cooled hydrogen storage element of claim 1, wherein said hydrogen storage alloy is a belt of compacted powered alloy.

3. The hydrogen gas cooled hydrogen storage element of claim 2, wherein said hydrogen storage alloy is a belt of compacted powered alloy physically bonded to a support means.

4. The hydrogen gas cooled hydrogen storage element of claim 3, wherein said hydrogen storage alloy is physically bonded to said support means by compaction or sintering or both.

5. The hydrogen gas cooled hydrogen storage element of claim 3, wherein said support means comprises at least one selected from the group consisting of mesh, grid, matte, foil, foam and plate.

6. The hydrogen gas cooled hydrogen storage element of claim 3, wherein said support means is formed from a metal.

7. The hydrogen gas cooled hydrogen storage element of claim 6, wherein said support means is formed from one or more metals selected from the group consisting of Ni, Al, Cu, Fe and mixtures or alloys thereof.

8. The hydrogen gas cooled hydrogen storage element of claim 2, wherein belt of compacted powered alloy is spirally wound into a coil.

9. The hydrogen gas cooled hydrogen storage element of claim 8, wherein said hydrogen flow channels are provided by corrugating at least one surface of said belt before it is spirally wound into a coil.

10. The hydrogen gas cooled hydrogen storage element of claim 8, wherein said hydrogen flow channels are provided by interleaving a flow channel material within said spirally wound coil.

11. The hydrogen gas cooled hydrogen storage element of claim 10, wherein said flow channel material is a corrugated polymer sheet.

12. The hydrogen gas cooled hydrogen storage element of claim 11, wherein said corrugated polymer sheet is a corrugated polypropylene sheet.

13. The hydrogen gas cooled hydrogen storage element of claim 11, wherein said corrugated polymer sheet is a corrugated polytetrafluoroethylene sheet.

14. The hydrogen gas cooled hydrogen storage element of claim 9, wherein said flow channel material is a corrugated metal sheet.

15. The hydrogen gas cooled hydrogen storage element of claim 14, wherein said corrugated metal sheet is formed from at least one metal selected from Ni, Al, Cu, and mixtures or alloys thereof.

16. The hydrogen gas cooled hydrogen storage element of claim 10, wherein said flow channel material is a metal foam sheet.

17. The hydrogen gas cooled hydrogen storage element of claim 10, wherein said flow channel material is a metal mesh sheet.

18. The hydrogen gas cooled hydrogen storage element of claim 10, wherein said flow channel material is a metal matte sheet.

19. The hydrogen gas cooled hydrogen storage element of claim 10, wherein said flow channel material is a graphite foam sheet.

20. The hydrogen gas cooled hydrogen storage element of claim 10, wherein said flow channel material is a graphite mesh sheet.

21. The hydrogen gas cooled hydrogen storage element of claim 10, wherein said flow channel material is a graphite matte sheet.

* * * * *